United States Patent
Daum

(10) Patent No.: US 9,592,573 B2
(45) Date of Patent: Mar. 14, 2017

(54) LASER DEPOSITION USING A PROTRUSION TECHNIQUE

(71) Applicant: Rolls-Royce Corporation, Indianapolis, IN (US)

(72) Inventor: Peter E. Daum, Fishers, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 395 days.

(21) Appl. No.: 14/143,514

(22) Filed: Dec. 30, 2013

(65) Prior Publication Data

US 2014/0263196 A1 Sep. 18, 2014

Related U.S. Application Data

(60) Provisional application No. 61/778,598, filed on Mar. 13, 2013.

(51) Int. Cl.
*B22F 3/105* (2006.01)
*B23K 26/34* (2014.01)
*B23P 6/00* (2006.01)

(52) U.S. Cl.
CPC .......... *B23K 26/345* (2013.01); *B23K 26/342* (2015.10); *B22F 3/1055* (2013.01); *B23K 2201/001* (2013.01); *B23K 2203/04* (2013.01); *B23K 2203/14* (2013.01); *B23P 6/007* (2013.01)

(58) Field of Classification Search
CPC .................................................... B22F 1/1055
See application file for complete search history.

(56) References Cited

U.S. PATENT DOCUMENTS

| | | | |
|---|---|---|---|
| 4,401,726 A | 8/1983 | Gnanamuthu | |
| 4,644,127 A | 2/1987 | La Rocca | |
| 5,122,632 A | 6/1992 | Kinkelin et al. | |
| 6,172,327 B1 | 1/2001 | Aleshin et al. | |
| 6,504,127 B1 | 1/2003 | McGregor et al. | |
| 6,727,459 B1 * | 4/2004 | Bialach | B23K 10/027 219/121.64 |
| 6,998,568 B2 | 2/2006 | Brehm et al. | |
| 7,139,633 B2 | 11/2006 | Mazumder et al. | |
| 7,651,658 B2 | 1/2010 | Aimone et al. | |
| 7,744,967 B2 | 6/2010 | Gourbesville et al. | |
| 7,984,547 B2 | 7/2011 | Steinhardt | |
| 8,076,607 B2 | 12/2011 | Lentz | |
| 8,089,028 B2 | 1/2012 | Rose | |
| 8,247,733 B2 | 8/2012 | Zhu | |
| 2006/0003095 A1 | 1/2006 | Bullen et al. | |
| 2007/0044306 A1 | 3/2007 | Szela et al. | |
| 2007/0176312 A1 | 8/2007 | Clark et al. | |
| 2008/0135530 A1 | 6/2008 | Lee et al. | |

(Continued)

OTHER PUBLICATIONS

International Search Report for PCT International Application Serial No. PCT/US2013/078248, completed Jun. 11, 2014, (11 pages).

*Primary Examiner* — Jessee Roe
*Assistant Examiner* — Ngoclan T Mai
(74) *Attorney, Agent, or Firm* — Barnes & Thornburg LLP

(57) ABSTRACT

A method of applying a laser metal formed build layer on a surface of an article. The surface of the article is melted locally using a light source to form a melt pool. Powdered metal is injected into the melt pool. The melt pool is solidified to form the build layer having a desired microstructure and geometry on the surface of the article.

11 Claims, 3 Drawing Sheets

(56) References Cited

U.S. PATENT DOCUMENTS

2008/0178994 A1 7/2008 Qi et al.
2010/0036470 A1 2/2010 Nielsen
2012/0164376 A1 6/2012 Bunker et al.
2012/0234512 A1 9/2012 Pickrell et al.

* cited by examiner

LASER DEPOSITION USING A PROTRUSION TECHNIQUE

CROSS REFERENCE TO RELATED APPLICATIONS

This application claims priority to and the benefit of U.S. Provisional Patent Application No. 61/778,598, filed 13 Mar. 2013, the disclosure of which is now incorporated herein by reference.

STATEMENT REGARDING FEDERALLY SPONSORED RESEARCH OR DEVELOPMENT

Embodiments of the present diclosure were made with government support under Contract No. FBG01169. The government may have certain rights.

FIELD OF THE DISCLOSURE

The present disclosure relates generally to a method of applying a metal build layer to a surface of a workpiece using laser deposition and more specifically to a method of applying a metal build layer to a surface of a workpiece using laser deposition resulting in a desired build out geometry.

BACKGROUND

Structures and components may be formed by successive deposition of materials. One example technique of such structure and component deposition is by direct laser deposition (DLD). During direct laser deposition, a wire or powder of deposition material is presented below a laser beam such that the laser beam heats the deposition material. The deposition material melts and, when re-solidified, becomes an integral part of a component structure.

Adding material to the component structure in this way is typically performed by individual build layers. Each build layer is formed on top of the previous build layer, resulting in a laser deposition build. As indicated, wires or powders are used for the deposition material. Consistency of deposition, however, may be difficult.

Laser deposition builds, especially on thin edges or thin airfoils, tend not to build out or maintain the desired geometric shape at the edges and corners of the build. Use of excessive power to generate a large melt pool and build profile can be used to obtain the correct build out geometry, but, in most cases, will negatively affect the microstructure of the laser deposition build.

SUMMARY

The present application discloses one or more of the features recited in the appended claims and/or the following features which, alone or in any combination, may comprise patentable subject matter.

A method of applying a laser metal formed build layer on a surface of an article, the method may include several steps. The steps may include the operations of surveying a first portion of an article to form a build layer on using a laser deposition process, identifying an area of the first portion with an increased risk of forming the build layer with at least one of an undesirable geometry and microstructure as a result of undergoing the laser deposition process, determining a first location for forming a first protrusion within the identified area, melting, at low heat, the article at the first location using a light source to establish a first melt pool, injecting powdered metal into the first melt pool, and solidifying the first melt pool to form the first protrusion, the first protrusion having a first microstructure.

In some embodiments, the method may include the steps of melting, at low heat, the first protrusion using the light source to establish a second melt pool, injecting powdered metal into the second melt pool, and solidifying the second melt pool to increase the size of the first protrusion, the first protrusion retaining the first microstructure. In some embodiments, the method may include the steps of melting, at low heat, the first portion of the article, including the first protrusion, using the light source to establish a number of melt pools, injecting powdered metal into the number of melt pools, solidifying the number of melt pools to form a build layer on the first portion of the article, the build layer having a desired geometry and a second microstructure.

In some embodiments, the second microstructure may be about the same as the first microstructure. In some embodiments, the article may have a third microstructure and the first microstructure of the first protrusion, the second microstructure of the build layer, and the third microstructure of the article may be about the same.

In some embodiments, melting, at low heat, the article at the first location using a light source to establish a first melt pool may be performed by a pulsing power light source. In some embodiments, melting, at low heat, the first portion of the article, including the first protrusion, using the light source to establish a number of melt pools may be performed by a continuous power light source.

In some embodiments, the area of the first portion with an increased risk of forming the build layer with at least one of an undesirable geometry and microstructure as a result of undergoing the laser deposition process may include at least one of an edge and a corner of the article. In some embodiments, the method may include the steps of determining a second location for forming a second protrusion within the identified area, melting, at low heat, the article at the second location using a light source to establish a second melt pool, injecting powdered metal into the second melt pool, and solidifying the second melt pool to form the second protrusion, the second protrusion having the first microstructure.

These and other features of the present disclosure will become more apparent from the following description of the illustrative embodiments.

DETAILED DESCRIPTION OF THE DRAWINGS

Figure 1:
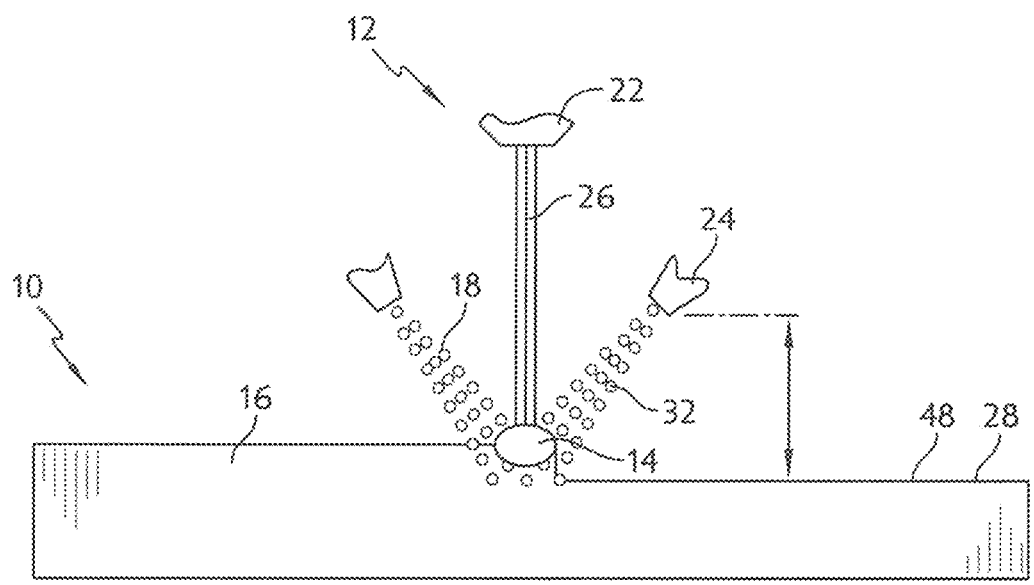
FIG. 1 is a side elevation view of a portion of a laser deposition process showing a damaged component and a laser deposition head spaced apart from the damaged component, the laser deposition head producing a laser beam aimed at a surface of the component to produce a melt pool on a metal substrate of the surface and depositing a powdered metal feedstock into the melt pool and suggesting that a metal build layer, integrated with the surface, remains after the melt pool cools.

For the purposes of promoting an understanding of the principles of the disclosure, reference will now be made to a number of illustrative embodiments illustrated in the drawings and specific language will be used to describe the same.

Figure 2:
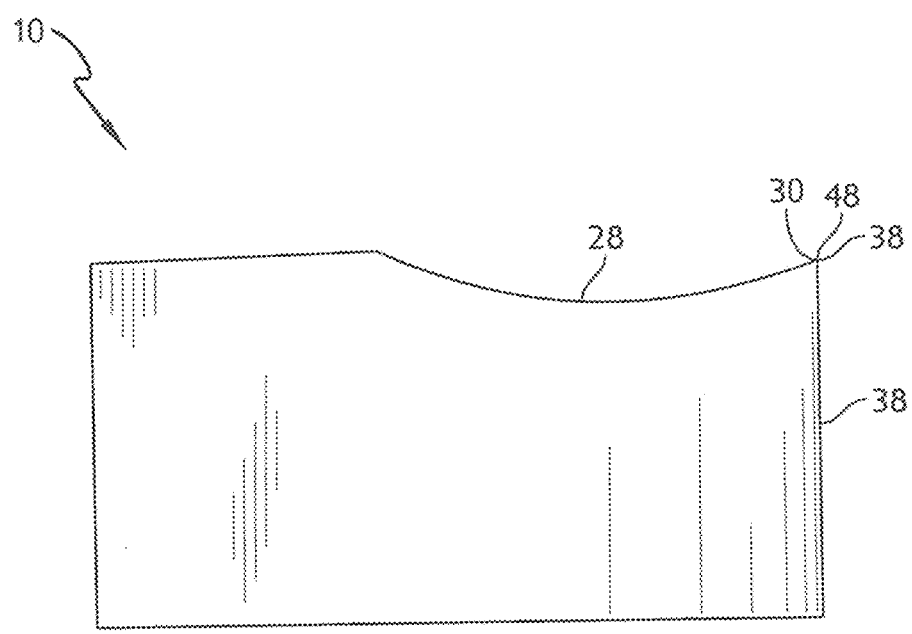
FIG. 2 is a side elevation view of a portion of the damaged component of FIG. 1 showing that the component has a material defect portion in need of repair and that the material defect portion includes a corner and edge of the component.

A method of a portion of a laser blown powder deposition technique used manufacture or restore a workpiece 10 is disclosed. The workpiece 10 may be, for example, a vane or blade of a gas turbine engine. In the illustrative embodiment, the workpiece 10 is a damaged component 10 as shown in FIG. 2. The component 10 is formed from at least one of a variety of materials. For example, the component 10 may be formed from nickel, titanium, cobalt, or steel alloys. As shown in FIG. 1, the method of manufacturing or restoring the component 10 uses a laser deposition head 12 to produce a melt pool 14 in a portion 28 of the component 10 and inject powdered metal 18 into the melt pool 14. The melt pool 14 is then allowed to cool and a build layer 16, integrated with the component 10, remains.

In the illustrative embodiment, the laser deposition head 12 includes a light source 22 and at least one nozzle 24. In the illustrative embodiment, the light source 22 is a laser. The light source 22 has a variable power. In the illustrative embodiment, the power is a specific power and remains substantially constant during the laser deposition process. In the illustrative embodiment, the power is set to produce a low heat melt pool 14 that cools to form a build layer 16 with a desired microstructure. The light source 22 directs a beam of light 26 at a first portion 28 of the component 10 to heat and melt, locally, an area 30 of the first portion 28 to produce melt pool 14.

The nozzle 24 is connected to a powder feeder containing powdered metal 18. The nozzle 24 sprays a powdered-metal flow 32 containing the powdered metal 18 at a flow rate. The powdered-metal flow 32 may have a variable flow rate. In the illustrative embodiment, the flow rate is constant. The nozzle 24 is oriented such that the powdered-metal flow 32 sprays towards the beam of light 26 and the melt pool 14 as shown in FIG. 1. As such, the powdered metal 18 from the nozzle 24 is injected into the melt pool 14. The laser deposition head 12 is moved away from the first portion 28 and the melt pool 14 is allowed to cool. As the melt pool 14 cools, the build layer 16 develops on the portion 28 due to the injected powdered metal 18.

Figure 3:
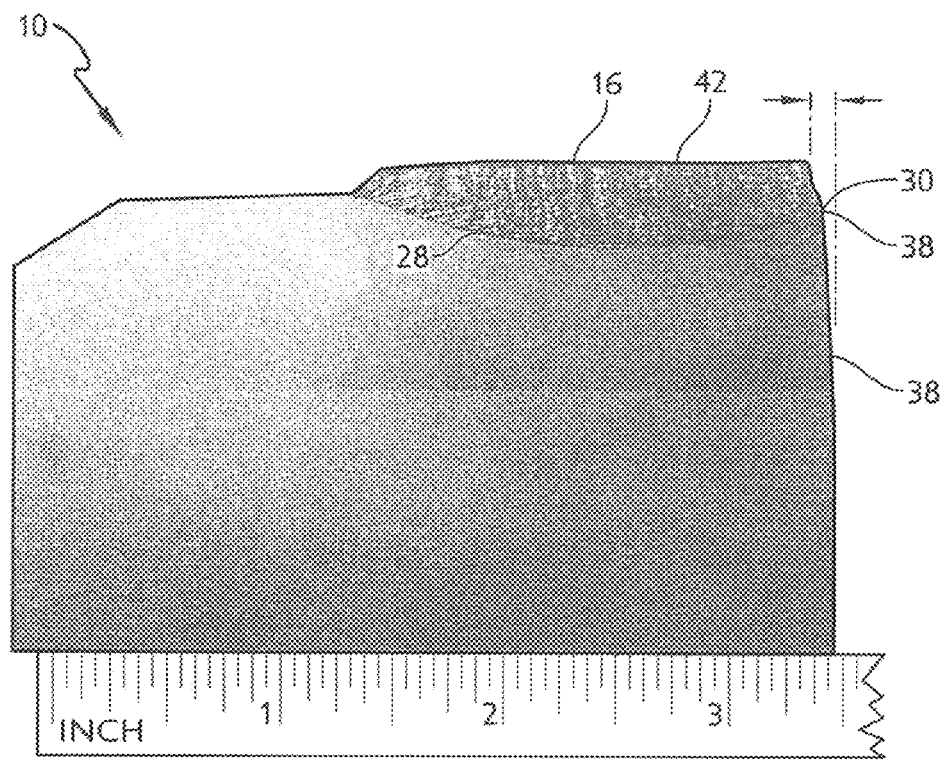
FIG. 3 is a side elevation view of a portion of the damaged component of FIG. 2 that was repaired using a laser deposition technique without forming the protrusions in the risk area of the portion, the damaged component having a geometrically incorrect corner and edge after the repair as a result of not forming the protrusions during the laser deposition technique used to repair the damaged component.

A first portion 28 of the component 10 may include risk areas 30 with an increased risk of forming the build layer 16 with undesired geometry and/or microstructure as shown in FIG. 2. For example, corners and edges 38 of component 10 may be areas with an increased risk of forming the build layer 16 with an undesired geometry and/or microstructure. The corners and edges 38 may be thin and the melt pool 14 produced at the corners and edges 38 may cause the geometry of the component 10 to deform. The build layer 16 is then formed on the deformation, causing the build layer to have an undesirable geometry, as shown in FIG. 3. As an example, the build layers 16 result in an overall build 42 that does not build out to an edge 38 of component 10 as shown in FIG. 3. As such, the component 10 of FIG. 3 has an undesirable geometry.

The component 10 may be heated to high temperatures to produce a large melt pool 14 at the corner and edges 38 of component 10 and inject a large amount of powdered metal 18 into melt pool 14. This process produces corners and edges 38 with desirable geometry; however, the microstructure of the build layer 16 is undesirable due to the high temperatures of melt pool 14.

In accordance with the present disclosure, laser parameters and tool paths are determined to create a number of build layers 16 and an overall build 42 with a desired geometry and microstructure 40. The portion 28 of the component 10 is first surveyed to create information relating to the shape and contour of the portion 28 receiving build layers 16. In the illustrative embodiment, the survey is performed by geometrically scanning the candidate component 10. An adaptive model of the portion 28 is created from the scanned model and the adaptive model is used to generate a build model of the portion 28. The build model is then sliced into layers representing the build height of each build layer 16.

After the survey, the risk areas 30 of the portion 28 having an increased risk of forming the build layers 16 with undesirable geometry or microstructure are identified. The risk areas 30 may be, for example, corners and edges of the component 10.

Figure 2A:
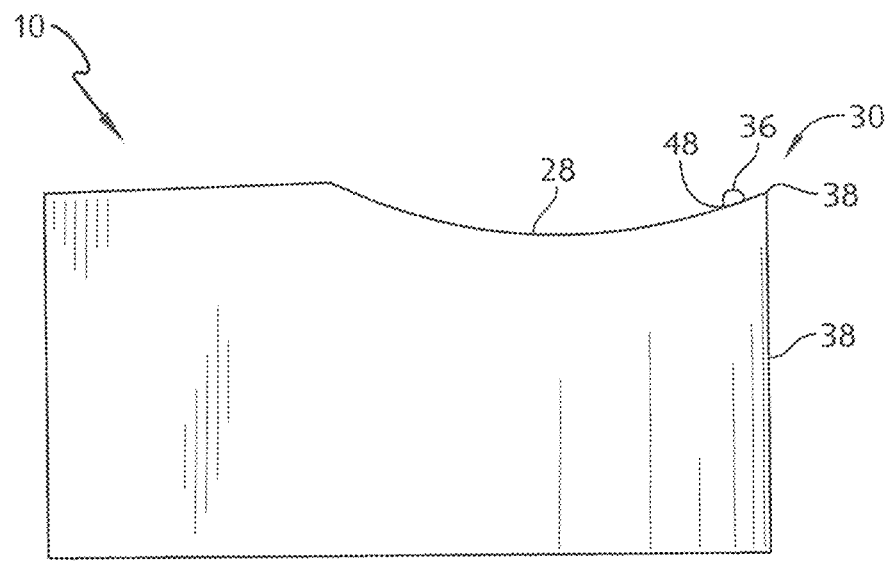
FIG. 2A is a side elevation view of the portion of the damaged component of FIG. 2 showing that at least one protrusion has been formed in a risk area of the material defect portion prior to a first build layer being formed on the material defect portion such that the first build layer will form with a desired geometry and microstructure.
Figure 2B:
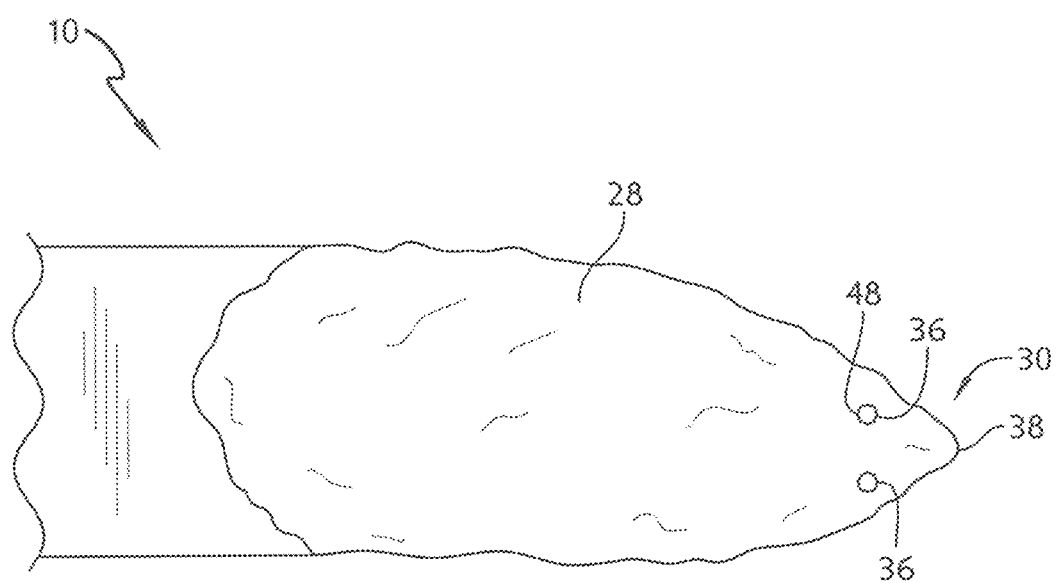
FIG. 2B is a plan view of the portion of the damaged component of FIG. 2A showing two protrusions formed in the risk area of the material defect portion prior to the first build layer being formed on the material defect portion such that the first build layer will form a desired geometry and microstructure.

A first location 48 of the risk area 30 to form a protrusion 36 is determined as shown in FIG. 2B. The protrusions 36 add extra material to the risk area 30. The extra material allows the build layer 16 to form with a desired geometry and microstructure at the risk area 30.

The first location 48 is melted to produce a first melt pool 14 using the light source 22 at a low heat. In some embodiments, the light source 22 is continuously on for a specific time to produce the first melt pool 14. In some embodiments, the light source 22 is pulsed at specific time intervals to produce the first melt pool 14.

The specific amount of powdered metal 18 is injected into the first melt pool 14. The specific amount of powdered metal 18 is determined such that the protrusion 36 is a specific size. In some embodiments, the size of protrusion 36 has a specific height and diameter. The first melt pool 14 is allowed to cool to form the first protrusion 36 as shown in FIGS. 2A and 2B. The heat used to create first melt pool causes protrusion 36 to have a first microstructure 54.

In some embodiments, the first protrusion 36 is melted using the light source 22 to form a second melt pool 50. In the illustrative embodiment, second melt pool is formed using low heat. A specific amount of powdered metal 18 is injected into the second melt pool and allowed to cool to increase the size of the first protrusion 36. This process may be repeated until the first protrusion 36 has a desired size. The heat used to produce the second melt pool causes the first protrusion 36 to have a second microstructure. In some embodiments, the first microstructure is equal to the second microstructure.

Additional protrusions 36 may be formed in the risk area 30 or any other portion 28 of the component 10 as shown in FIG. 2B. As such, any number of protrusions 36 may be formed, each having a specific size independent of the other protrusions 36. In some embodiments, the individual protrusions 36 are located to within a couple thousandths of an inch. In some embodiments, the light source 22 on and off times are specified in milliseconds. In some embodiments, the location of the protrusions 36 are specifically sequenced to limit the heat input to the component 10 and the build 42.

Figure 4:
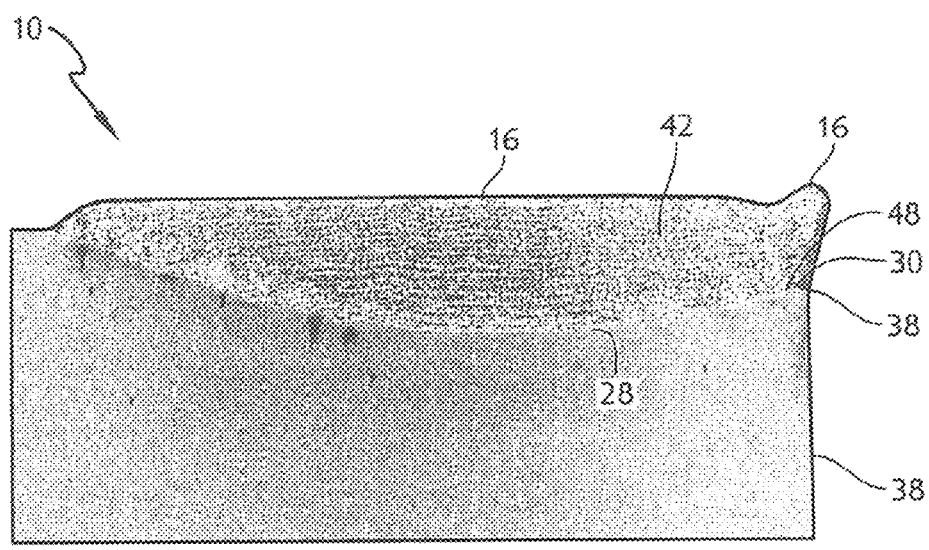
FIG. 4 is a side elevation view of a portion of the damaged component of FIG. 2 that was completely repaired by forming the protrusions during the laser deposition technique in accordance with the present disclosure, the damaged component having a corner and edges with a correct geometry and microstructure after the repair as a result of the protrusions being formed during the laser deposition technique used to repair the damaged component.

After the protrusions 36 are formed in the risk area 30 of the component, a known process of forming the build layer 16 is performed. The build layer 16 is formed by the light source 22 forming the melt pools 14 over the entire surface of the first portion 28, including the protrusions 36. Powdered metal 18 is injected into the melt pools 14. The melt pools 14 are allowed to cool and the build layer 16, integrated with the component 10, is formed. Additionally the protrusions 36 may be formed at the risk areas 30 of the component 10 on top of the build layer 16. An additional build layer 16 may then be formed using the technique previously described. These steps may be repeated until the overall build 42 is formed on the first portion 28 of the component 10. The overall build 42 has a desired third microstructure and geometry as shown in FIG. 4. The component 10 of FIG. 4 has build layers 16 that build out past the edge and the corner 38 such that the geometry of the build 42 is the desired geometry and microstructure.

The desired third microstructure and geometry are a result of the forming the protrusions as techniques that do not include the protrusions 36 result in either or both undesired geometry or microstructure. In some embodiments, the third microstructure is about equal to the first and/or second microstructures. In some embodiments, the third microstructure is about equal to the microstructure of the component 10.

This technique should not be confused with different types of metal transfer associated with arc welding processes, such as Metal Inert Gas (MIG) welding, as the disclosed technique focuses on placing very discrete protrusions 36 of the laser deposition material at specific locations with extremely short pulses of the light source 22 and in a specific sequence. In the area of gas turbine engine components and, more particularly, in the case of the tip end side of Leading Edge Tip Build up and both ends of the TIP repairs, the disclosed technique is used to build out the tip corners. For example, a fifteen degree angle from the tip ramp end of the Leading Edge Tip Build and on both ends of the TIP repairs may be used to account for overbuild to allow enough material clean up back to the original blade contour. To ensure the build-out is sufficient to maintain the angle, adding the protrusion to additional material before the contour deposition may be necessary.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of applying a laser metal formed build layer on a surface of an article, the method comprising the operations of
    surveying a first portion of an article to form a build layer thereon using a laser deposition process,
    identifying an area of the first portion including at least one of an edge and a corner of the article,
    determining a first location for forming a first protrusion within the identified area,
    melting-the article at the first location using a light source to establish a first melt pool,
    injecting powdered metal into the first melt pool,
    solidifying the first melt pool to form the first protrusion, the first protrusion having a first microstructure,
    determining a second location for forming a second protrusion within the identified area,
    melting-the article at the second location using a light source to establish a second melt pool,
    injecting powdered metal into the second melt pool, and
    solidifying the second melt pool to form the second protrusion, the second protrusion having the first microstructure.

2. The method of claim 1, wherein melting-the first portion of the article, including the first protrusion, using the light source to establish a number of melt pools is performed by a continuous power light source.

3. The method of claim 2, wherein melting-the article at the first location using a light source to establish a first melt pool is performed by a pulsing power light source.

4. The method of claim 3, wherein melting-the article at the second location using a light source to establish a second melt pool is performed by a pulsing power light source.

5. The method of claim 1, further comprising the steps of
    melting-the first protrusion using the light source to establish a third melt pool,
    injecting powdered metal into the third melt pool, and
    solidifying the third melt pool to increase the size of the first protrusion, the first protrusion retaining the first microstructure.

6. The method of claim 1, further comprising the steps of
    Melting the first portion of the article, including the first protrusion, using the light source to establish a number of melt pools,
    injecting powdered metal into the number of melt pools, and
    solidifying the number of melt pools to form a build layer on the first portion of the article, the build layer having a desired geometry and a second microstructure.

7. The method of claim 1, wherein the second microstructure is about the same as the first microstructure.

8. The method of claim 1, wherein melting the first portion of the article, including the first protrusion, using the light source to establish a number of melt pools is performed by a continuous power light source.

9. The method of claim 8, wherein melting the article at the first location using a light source to establish a first melt pool is performed by a pulsing power light source.

10. The method of claim 1, wherein melting the first portion of the article, including the first protrusion, using the light source to establish a number of melt pools is performed by a continuous power light source.

11. The method of claim 10, wherein melting the article at the first location using a light source to establish a first melt pool is performed by a pulsing power light source.

* * * * *